May 1, 1945.　　　　　D. O. RAPER　　　　　2,374,955
SPRAYER
Filed Aug. 2, 1943　　　　3 Sheets-Sheet 1

WITNESSES:

Doyle O. Raper,
INVENTOR.

BY
Victor J. Evans & Co.
ATTORNEYS

May 1, 1945.  D. O. RAPER  2,374,955
SPRAYER
Filed Aug. 2, 1943   3 Sheets-Sheet 3

Doyle O. Raper,
INVENTOR.

BY
Victor J. Evans & Co.
ATTORNEYS

WITNESSES:

Patented May 1, 1945

2,374,955

UNITED STATES PATENT OFFICE 2,374,955

SPRAYER

Doyle O. Raper, Arbuckle, Calif.

Application August 2, 1943, Serial No. 497,064

2 Claims. (Cl. 261—28)

My invention relates to the application of spraying solutions to orchards and the like, and has among its objects and advantages the provision of an improved sprayer designed to be carried on a tractor, wherein the sprayer is so devised as to be readily operated by the driver of the tractor, and in which the sprayer embodies novel adjustment for directing the sprayed solution in a desired manner.

Figures 1, 2:
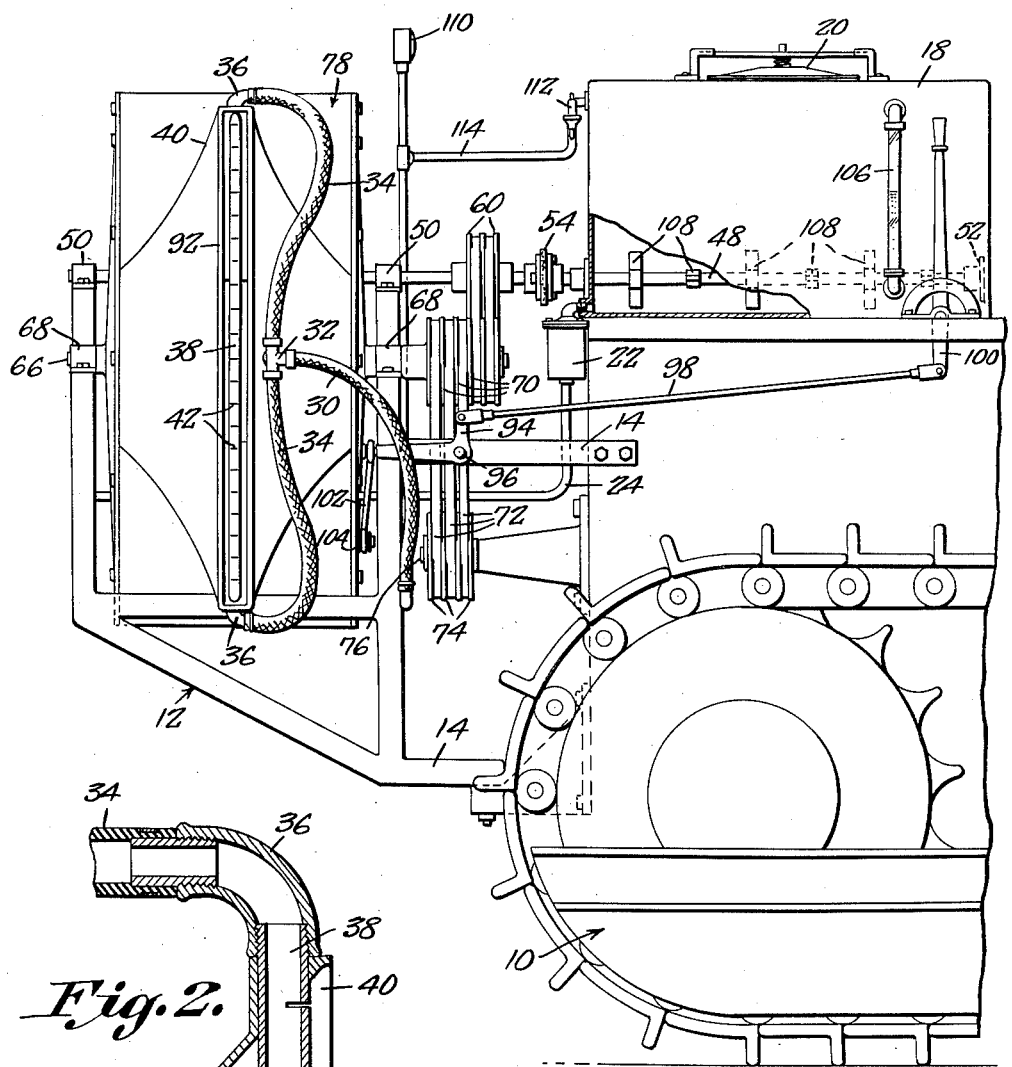
Figure 1 is a side elevational view illustrating my invention applied to a conventional tractor.
Figure 2 is a sectional detail view of a slotted spray pipe.

In the embodiment selected for illustration, I make use of a conventional tractor preferably of the caterpillar type, the rear end portion of which is illustrated at 10 in Figure 1. A frame 12 is bolted to the tractor through the medium of brace arms 14. Upon a frame 16 mounted on the tractor is located a solution-containing tank 18 provided with a lid 20 for filling purposes.

A filter 22 is tapped into the tank 18 at its bottom and is provided with a pipe 24 leading to a pump 26 of the rotary type. A pipe 28 is connected at one end with the pump 26 and at the other end with a flexible hose 30 connected with a T coupling 32. The short lengths of hose 34 are connected with the T coupling 32 and with elbows 36 each connected with one end of a spray pipe 38 extending transversely of a spray nozzle 40. Slots 42 are provided in the spray pipe 38 through which the spraying solution is forced under pressure by reason of the pump 26. The pump sprocket 42 is connected with a chain 44 which passes around a sprocket 46 keyed to a shaft 48 supported in bearings 50 mounted on the frame 12 and in bearings 52 mounted on the end walls of the tank 10, this shaft extending longitudinally inside the tank a short distance above its bottom. A flexible coupling 54 is interposed in the shaft 48. Bearings 56 mounted on the frame 12 rotatably support the shaft 58 to which the pump sprocket 42 is keyed.

Two grooved wheels 60 are keyed to the shaft 48 for connection with V belts 62 passing over grooved wheels 64 keyed to a fan shaft 66 rotatably supported in bearings 68 mounted on the frame 12. Three grooved wheels 70 are keyed to the shaft 66 for connection with V belts 72 passing around grooved wheels 74 connected as a unit with a power take-off shaft 76 of the tractor.

Figure 3:
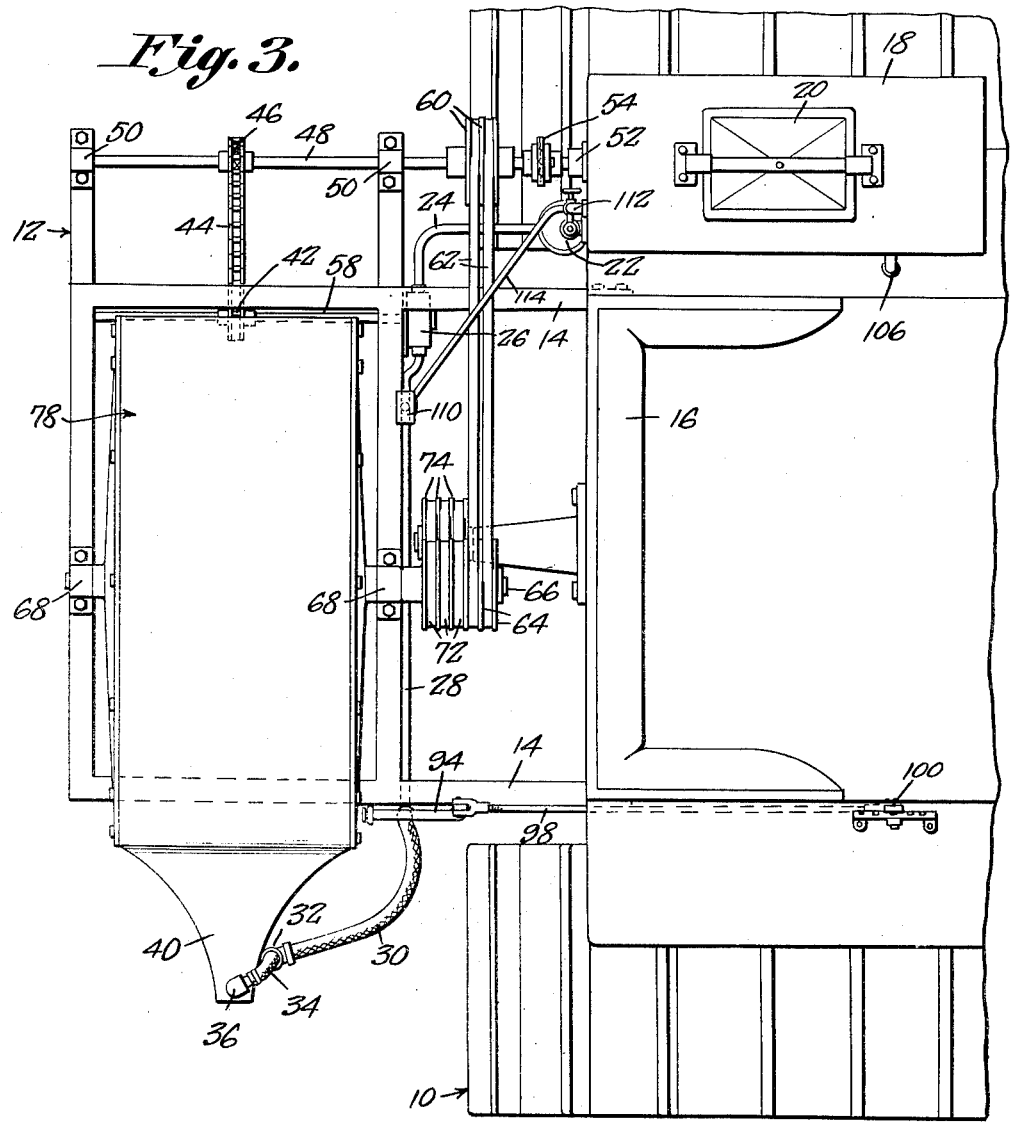
Figure 3 is a top plan view of the structure illustrated in Figure 1.
Figure 4:
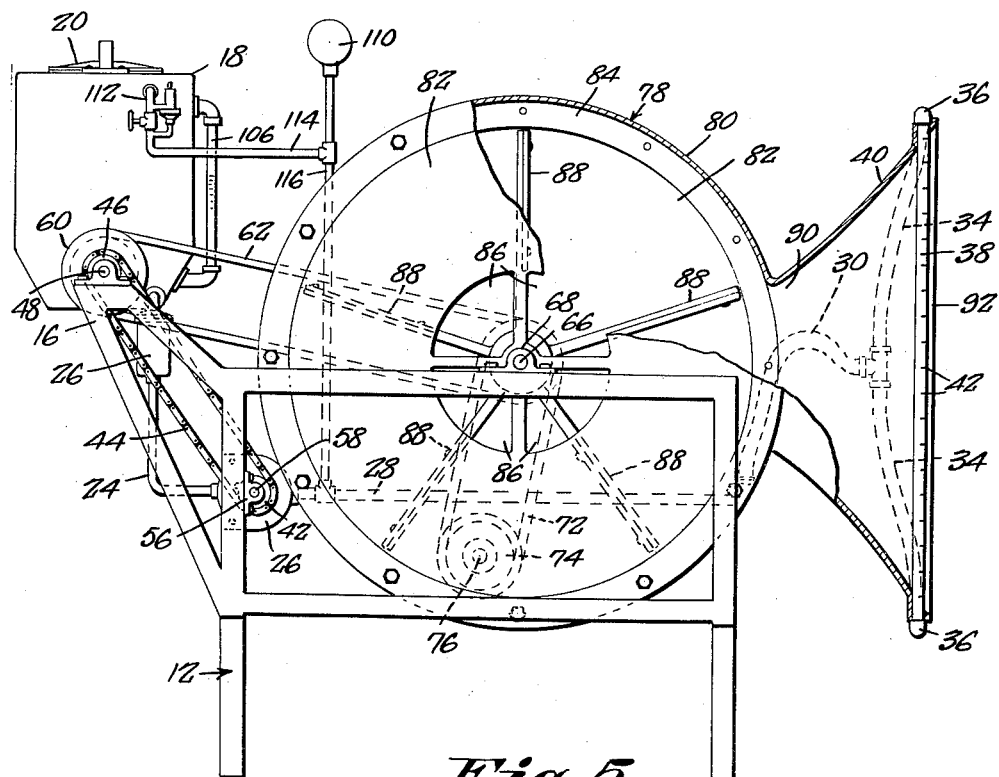
Figure 4 is a side view of the sprayer with portions broken away for the purpose of illustration.
Figure 5:
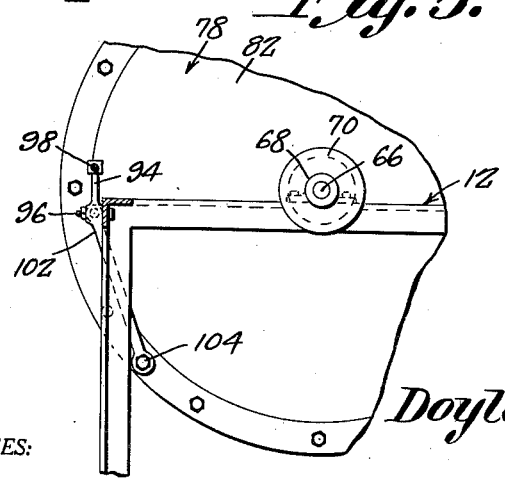
Figure 5 is a detail view of the sprayer adjustment for directing the sprayed solution at different angles.

Upon the fan shaft 66 is mounted a fan housing 78 having a circumferential wall 80 and removable end walls 82 bolted to flanges 84 secured to the circumferential wall 80. At least one of the end walls 82 is provided with air inlet openings 86, and fan blades 88 are fixedly secured to the fan shaft 66. The nozzle 40 is secured to the circumferential wall 88 and the latter is provided with an air outlet opening 90 communicating with the funnel-shaped nozzle 40, when viewed according to Figure 4. However, the nozzle is flattened when viewed according to Figures 1 and 3 so as to provide a slot-like opening 92 within which the spray pipe 38 is positioned, the slot being slightly wider than the outside diameter of the pipe to provide escape for air under pressure between the pipe and the two side walls of the nozzle.

The nozzle 40 is arranged so as to discharge the spray laterally from the direction of travel of the tractor and immediately in the rear thereof. The spraying solution is under pressure in the spray pipe 38 and the fan in the housing 78 creates an air blast which effectively carries the spraying solution in a mist-like formation to its place of application on the growth being sprayed.

Means are provided for rotating the fan housing 78 about the axis of the fan shaft 66 to change the angularity of the nozzle 40 to the end that the spraying solution may be applied to growths of different heights. A bell crank 94 is pivoted at 96 on one of the arms 14, and one arm of the bell crank is pivotally connected with one end of a rod 98 having its other end pivotally connected with a lever 100. The other arm of the bell crank 94 is pivotally connected with a link 102 pivotally connected at 104 with one of the side plates 82 of the fan housing. Thus the fan housing may be rotated through manipulation of the lever 100 for varying the angularity of the nozzle 40.

The sprayer in the instant case is mounted on the tractor so as to eliminate the necessity of hooking a spraying machine in the rear of the tractor. The sprayer is relatively light in weight but is sufficiently powerful in its action to perform an efficient spraying function. In mounting the spray mechanism on a tractor of the caterpillar type, the tractor may be operated in fields which are relatively wet without doing harm to the soil or miring the machine. More important, the sprayer is so arranged on the tractor as to be within easy control of the driver thereof, which eliminates the necessity of additional help for supervising the operation of the sprayer.

A gage glass 106 is provided for the tank 18 so as to indicate the liquid level therein. Agitators 108 are mounted on the shaft 48 inside the tank 18 for thoroughly mixing the spraying solution. A pressure gage 110 is tapped into the pipe 78, and a pressure regulator 112 is interposed in a pipe 114 communicating with the tank 18 and the pipe 116 to the gage 110, the pipe 116 being tapped into the pipe 28.

Without further elaboration, the foregoing will so fully illustrate my invention, that others may, by applying current knowledge, readily adapt the same for use under various conditions of service.

I claim:

1. In a sprayer for use with powered vehicles having a power take-off, a rotary shaft having a fan mounted thereon, a fan housing enclosing the fan and having an elongated nozzle, said fan housing being adjustable to fix the position of the nozzle, a slotted tube in the nozzles, pressure means for delivering spray material to both ends of the slotted tube and including a spray supply tank, a pump, and conduits from the supply tank to the pump and from the pump to the tube.

2. In a sprayer for use with a powered vehicle having a power take-off, a rotary shaft having a fan mounted thereon, an adjustable fan housing enclosing the fan and having a relatively narrow elongated nozzle, a slotted tube in the nozzle and extending from top to bottom thereof and spaced from its sides to prevent air under pressure to pass about the tube, pressure means for delivering spray material to both ends of the tube and including a spray material supply tank, a pump connected with the tank and a flexible conduit having branch connections, one leading to each end of the tube, and manual operating means connected with the fan housing to adjust the position of the same to direct the discharge of the nozzle.

DOYLE O. RAPER.